United States Patent
El-Kik et al.

(10) Patent No.: US 6,744,888 B1
(45) Date of Patent: Jun. 1, 2004

(54) LINE INTERFACE CIRCUIT WITH EVENT DETECTION SIGNALING

(75) Inventors: Tony El-Kik, Allentown, PA (US); Keith E. Hollenbach, Kutztown, PA (US); Donald R. Laturell, Allentown, PA (US); Steven B. Witmer, Sinking Spring, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/192,712

(22) Filed: Nov. 16, 1998

(51) Int. Cl.[7] .............................. H04M 1/00; H04M 9/00
(52) U.S. Cl. ............. 379/412; 379/399.01; 379/399.02; 379/413.02; 379/413.03; 379/413.04
(58) Field of Search ............... 379/412, 413.02–413.04, 379/93.05, 399.01, 399.02

(56) References Cited

U.S. PATENT DOCUMENTS

| | | | | |
|---|---|---|---|---|
| 4,645,874 A | * | 2/1987 | Fildes | |
| 5,500,895 A | * | 3/1996 | Yurgelites | |
| 5,654,984 A | * | 8/1997 | Hershbarger et al. | |
| 5,655,010 A | * | 8/1997 | Bingel | |
| 5,666,355 A | * | 9/1997 | Huah et al. | |
| 5,864,607 A | * | 1/1999 | Rosen et al. | |
| 6,005,923 A | * | 12/1999 | Lee | 379/399.01 |
| 6,055,641 A | * | 4/2000 | Konaka et al. | |
| 6,205,219 B1 | * | 3/2001 | Hollenbach et al. | |
| 6,266,348 B1 | * | 7/2001 | Gross et al. | |
| 6,289,070 B1 | * | 9/2001 | Krone et al. | |
| 6,351,530 B1 | * | 2/2002 | Rahamim et al. | |

* cited by examiner

Primary Examiner—Ramnandan Singh
(74) Attorney, Agent, or Firm—Synnestvedt & Lechner LLP

(57) ABSTRACT

A telephone line interface circuit with event detection capabilities is provided that screens out transient signals and provides an indication to the line side that an actual event has occurred; so that appropriate discrimination circuitry is powered up to determine the exact nature of the actual event only when needed. An event detector develops an AC signal that represents the events to be detected. This AC signal is timed to determine its sustained rate. The sustained rate has a timing threshold which is higher than a transient that occurs on the line. If the incoming signal does not meet the required threshold timing, it is disregarded as being transient and no action is taken. If the incoming signal meets the threshold requirement, the line interface circuit switches to the full power mode and facilitates the actual data transmission.

29 Claims, 5 Drawing Sheets

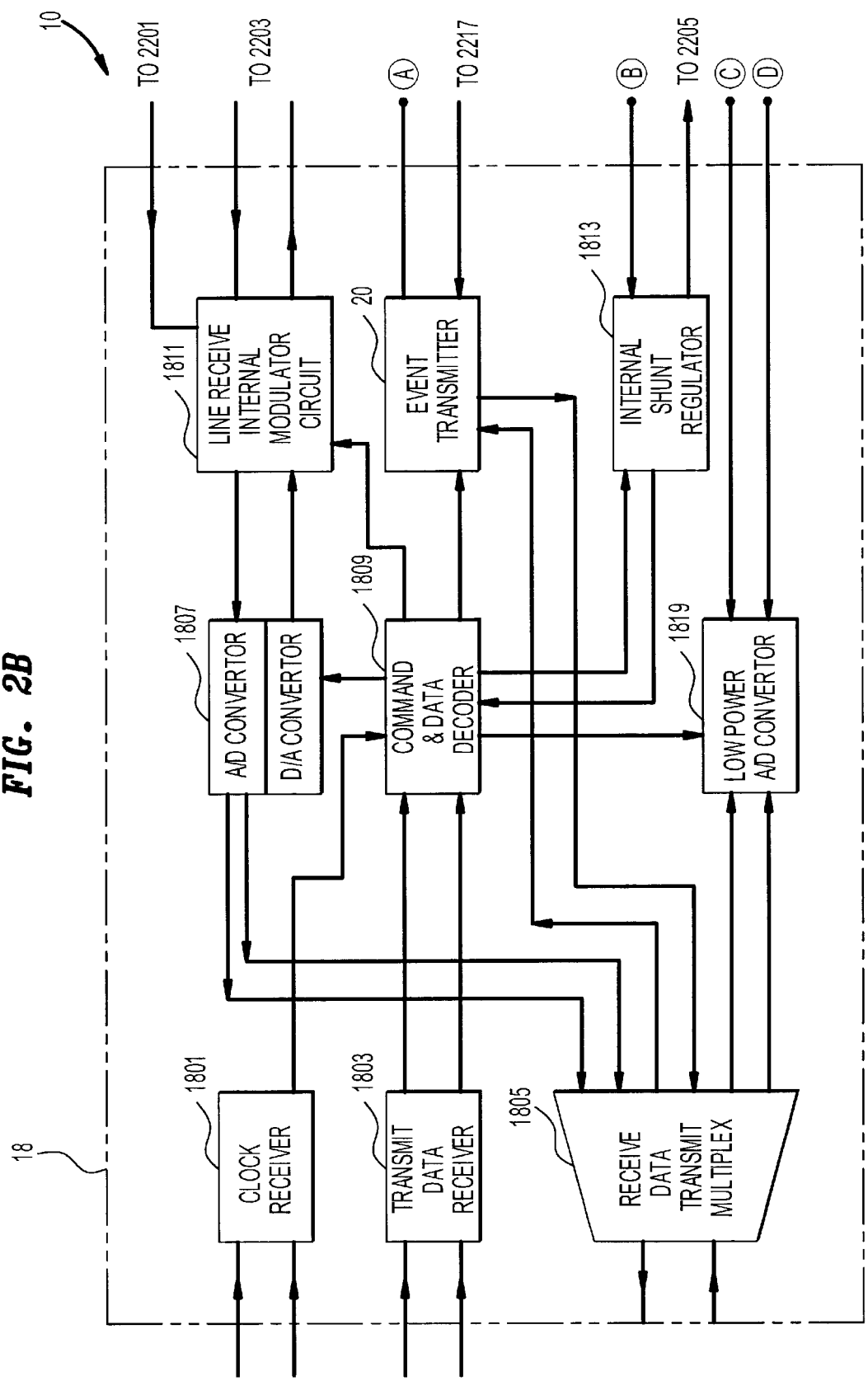

LINE INTERFACE CIRCUIT WITH EVENT DETECTION SIGNALING

CROSS-REFERENCE TO RELATED APPLICATIONS

This application is related to an application entitled "Combination Clock and Charge Pump for Line Powered DAA" and an application entitled "Event Detection Circuit", both of which are assigned to the assignee of the present invention and both of which were filed concurrently with this application.

FIELD OF THE INVENTION

This invention generally relates to the field of telecommunication networks, and more particularly to a telephone line interface circuit with event detection capabilities.

BACKGROUND OF THE INVENTION

Telephone networks comprise a series of interconnected subsystems that are linked together at points called interfaces. These interfaces provide links between different equipment in the network and allow for simplified design and maintenance. A local loop is an example of an interface that connects a subscriber's telephone set (device side) and the central office (line side).

Many portable computer devices also utilize modems and other data devices for communicating over a telephone line. The battery source, which powers both the portable computer device and its modem, is typically sized for general computing applications, and runs out of power quickly when actively communicating over a telephone line through a modem. Thus, although portable computer devices operate for a sufficient length of time for quick data transfers over a modem powered completely by a battery, they typically require that external AC power be supplied to allow for longer uses of the modem. It is therefore desirable for battery powered computer devices including a modem to draw power, in addition to the inherent battery, from a secondary power source.

The DC power inherent in a telephone line provides a convenient source of power, but there are often limitations and restrictions which limit the ability of a modem to derive power from the telephone line. For instance, present regulations in the United States require that significant current may only be drawn from the telephone line when the telephone or modem is in an off-hook or active condition. In order to hold the telephone line in an off-hook condition, current in the approximate range of 20 milliamps (MA) to 150 MA must be drawn.

The U.S. Federal Communication Commission (FCC) and other counterpart regulatory agencies in other countries also require electrical isolation between the line side and the user devices on the user side. The user devices include telephone sets and computers using modems. Electrical isolation protects the line side from damage transmitted from the device side and vice-versa.

Many components (e.g., data access arrangements (DAAs) or codec's) of telephone line interface circuits are PSTN line-powered circuits that also require isolation from low-voltage power supplies. Because of this required isolation, a line powered interface circuit will not function until it is connected to a power source, i.e., the interface circuit must be activated when it is needed to connect the line side to the device side. When a circuit on the line side is placed in the "on-hook" state (e.g., a telephone receiver is placed in its cradle) the local loop is opened and almost all of the power to the interface circuit is cut off. Activating the DAA or codec requires that some power must be drawn from the loop or from another source. While in the on-hook state a small amount of current (idle-state loop current) can be drawn for a short period of time from the TIP/RING line to register that an event has occurred on the PSTN TIP and RING line. However, it is extremely inefficient to draw the extra power unless it is really needed, i.e., it is extremely wasteful of time and resources to power up the DAA or codec when a transient noise signal occurs on the TIP and RING line.

The primary events that the interface circuit must detect while in the on-hook state are the application of a TIP and RING signal and a polarity reversal of TIP and RING DC voltage, either of which may be used to signal the need for more power. A problem can arise because ordinary transients on the line can have electrical characteristics very similar to those of actual events. To discriminate between transients and actual events, prior art interface circuits employ discrimination circuitry that determines the exact nature of every signal introduced thereto, but these additional circuits draw higher amounts of power. While drawing additional power is acceptable on a temporary basis, the amount of power available is limited. Discrimination circuits must operate at power levels no higher than the amounts determined by regulatory agencies as "satisfactory" on-hook leakage currents.

In addition to determining what an event is, the event signals themselves must be transmitted from the device side to the line side. A problem arises because high voltage isolation prevents the transmission of the event signals from the device side to the line side. Prior art circuits avoid this problem by using optical couplers to transmit the signal caused by the actual event to the low voltage interface. These circuits employ a general purpose optical coupler with an LED input and a photo-transistor output. These optical couplers require "light pipes" which are cavities on the chip between the emitter and the detector of the optical coupler to allow the light to pass between the two. These light pipes increase the size and cost of the interface circuit. Capacitive coupling, another known isolation method, allows the circuit size to remain small and low cost, but the rate at which the events occur are too slow to accurately transmit them from the device side to the line side using capacitive coupling.

To avoid powering up the discrimination circuitry except when it is needed to process an actual event, it would be desirable to employ a line interface circuit which can distinguish between actual events (e.g., a ring signal, a polarity reversal, an audio signal) and noise (transient spikes on the line caused by a variety of sources, e.g., lightning, battery noise, etc.) before invoking the high power circuitry such as discrimination circuitry.

Accordingly, there remains a need for a simplified, smaller, and less costly telephone line interface circuit that can operate on the minimal amount of power available when the circuit is in the on-hook state to preliminarily distinguish between actual and noise events, and transmit event signals between the device side and line side while maintaining electrical isolation between the device side and the line side.

SUMMARY OF THE INVENTION

A telephone line interface circuit with event detection capabilities is provided that screens out transient signals and provides an indication to the line side that an actual event (actual data signal) has occurred so that appropriate discrimination circuitry is powered up to determine the exact nature of the actual event only when needed.

The telephone line interface circuit comprises a low voltage circuit including an event receiver, a line powered codec including an event transmitter, and an isolation circuit coupled between the low voltage circuit and the line powered codec. The low voltage circuit is coupled to the device side (host) of the network and the line powered codec (via sensory circuit) is coupled to the telephone line source of the network.

The line interface circuit switchabley operates in three modes—a low power mode, a medium power mode, and a full-power mode. The line interface circuit operates in the low power mode (sleep mode) unless the sensory circuit detects an input signal on the telephone line source. This input signal includes actual data signals and noise. Upon the receipt of an input signal, the line interface circuit switches to the medium power mode. The event transmitter and event receiver located in the line interface circuit develops an AC signal that represents the events (actual data signals) to be detected. This AC signal is timed to determine its sustained rate. The sustained rate has a timing threshold which is higher than a transient that occurrs on the line. Thus, the telephone line interface circuit checks the input (incoming on the telephone line source) signal to check whether it meets the threshold timing requirements. If the input signal does not require threshold timing, it is disregarded as being transient and no action is taken. This avoids the need to invoke the discrimination circuits that have large power requirements until they are actually needed. If the incoming signal meets the threshold requirement, the line interface circuit switches to the full power mode and facilitates the actual data transmission.

BRIEF DESCRIPTION OF THE DRAWING

FIGS. 2A, 2B, and 2C are detailed block diagrams depicting the hardware components of a line interface circuit in accordance with the present invention.

DETAILED DESCRIPTION OF A PREFERRED EMBODIMENT

The present invention provides a line interface circuit having event detection capabilities. The present invention is particularly useful for use with modems or other line powered data sources, including a digital signal processor (DSP) which provides a modulating AC signal for driving a line modulator. Although a DSP is not required to practice the invention, the use of a DSP generally increases system noise and thus increases the need for event detection techniques.

Figure 1:
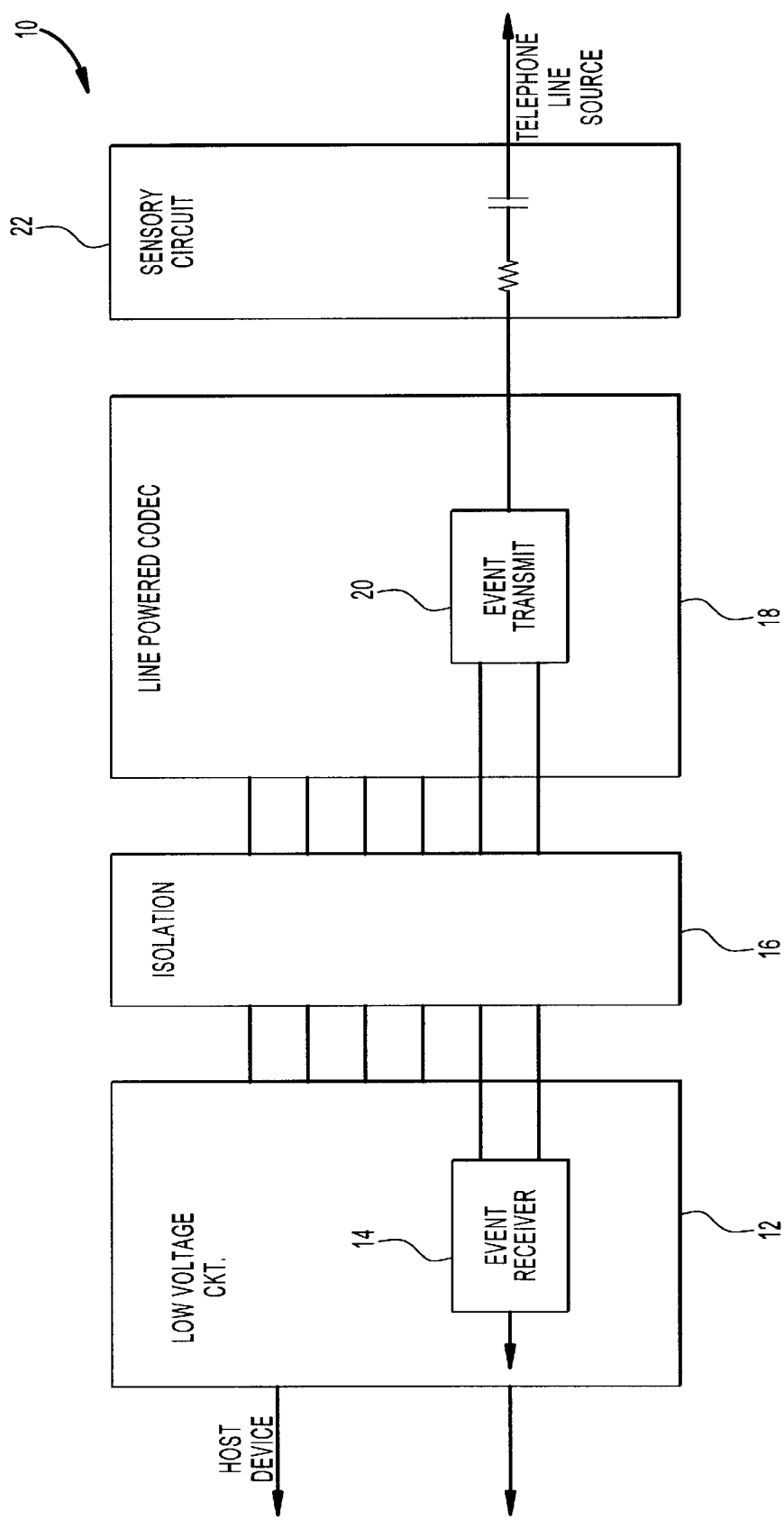
FIG. 1 is a general block diagram of a line interface circuit in accordance with the present invention.

FIG. 1 is a block diagram illustrating major components of a line interface circuit 10 according to the principles of the present invention. The line interface circuit 10 is designed to efficiently accommodate data transfers between equipment (e.g. telephone network central office equipment) on a line side (analog) and equipment (e.g. DSP, computer, data terminal) on a device side (digital).

The line interface circuit 10 comprises a low-voltage circuit 12, a line-powered codec 18, an isolation circuit 16 coupled between the low-voltage circuit 12 and the line-powered codec 18 (herein codec), and a sensory circuit 22.

The low-voltage circuit 12 is coupled to the device side (external host, DSP, computer) and acts as a transmitter for an outgoing digital data signal to the device side and a receiver for receiving an incoming digital data signal from the device side. It may also perform data decompression, data detection, and error detection operations.

The line-powered codec 18 is indirectly (through sensory circuit 22) coupled to the line side. It conditions (encodes) input signals supplied by the line side and conditions (decodes) the input signals supplied by the device side and produces output signals respectively to the device side and the line side. Thus, it provides a digital data signal to the low voltage circuit 12 by encoding an incoming analog telephone signal from the line side and decodes an incoming digital signal from the device side and provides it to the line side.

The low-voltage circuit 12 and line powered codec 18 are isolated by an isolation circuit 16 which provides the required voltage isolation and protects the low-voltage circuit 12 from any voltage spikes occurring on the line side. Similarly, the line side is electrically isolated form the device side.

The sensory circuit 22 is coupled between the line side (central office TIP and RING terminals) and the line powered codec 18. The sensory circuit 22 detects an incoming analog signal (ringing or polarity reversal or noise) on the line side and provides the feedback to the codec 18. The codec 18 then distinguishes whether the incoming analog signal was an actual event or a transient (noise, interference). This is accomplished by the event transmitter 20 located in the codec 18. The event transmitter 20 examines the incoming analog signal received from the sensory circuit 22 and generates an event-detect output signal only upon the determination that an actual event has occurred on the line side.

After receiving an event-detect output signal (which indicates an actual event has occurred), the line powered codec 18 facilitates the data transmission between the line side and the device side. This is accomplished by increasing the power drawn from the line side of the network. The line-powered codec 18 operates in three modes, off-hook power mode (full power mode), medium power mode, and low power mode(sleep mode). The off-hook power mode is a full power mode which draws the most power to accommodate the actual transmission of data signals. The medium power mode is a mid-level power mode and is used only to transmit ringing and CND (caller identification)-signals to the device side. The low power mode operates at a very low power level and is used when the line interface circuit 10 is in a sleep mode and is waiting for an event (ringing or polarity reversal).

The line interface circuit 10 first senses an incoming analog signal on the line side (e.g, ringing, polarity reversal, or noise). It then determines whether an actual event has occurred on the line side or if the incoming analog signal was a noise or other form of interference. After determining that an actual event has occurred it then conditions its circuitry (by turning to the full power mode) to receive an incoming analog telephone signal from the line side and to transmit a digital signal to the device to facilitate the transmission of the data signals between the line side and the device side.

The line interface circuit 10 is also capable of communication in the other direction i.e for receiving digital data from the device side and transmitting an outgoing analog telephone signal to the line side.

Thus, the line interface circuit 10 employs the required power only when necessary. The line interface circuit 10 operates at very low power and switches to the full power off-hook mode only after distinguishing between an actual event and a transient event.

Figure 2A:
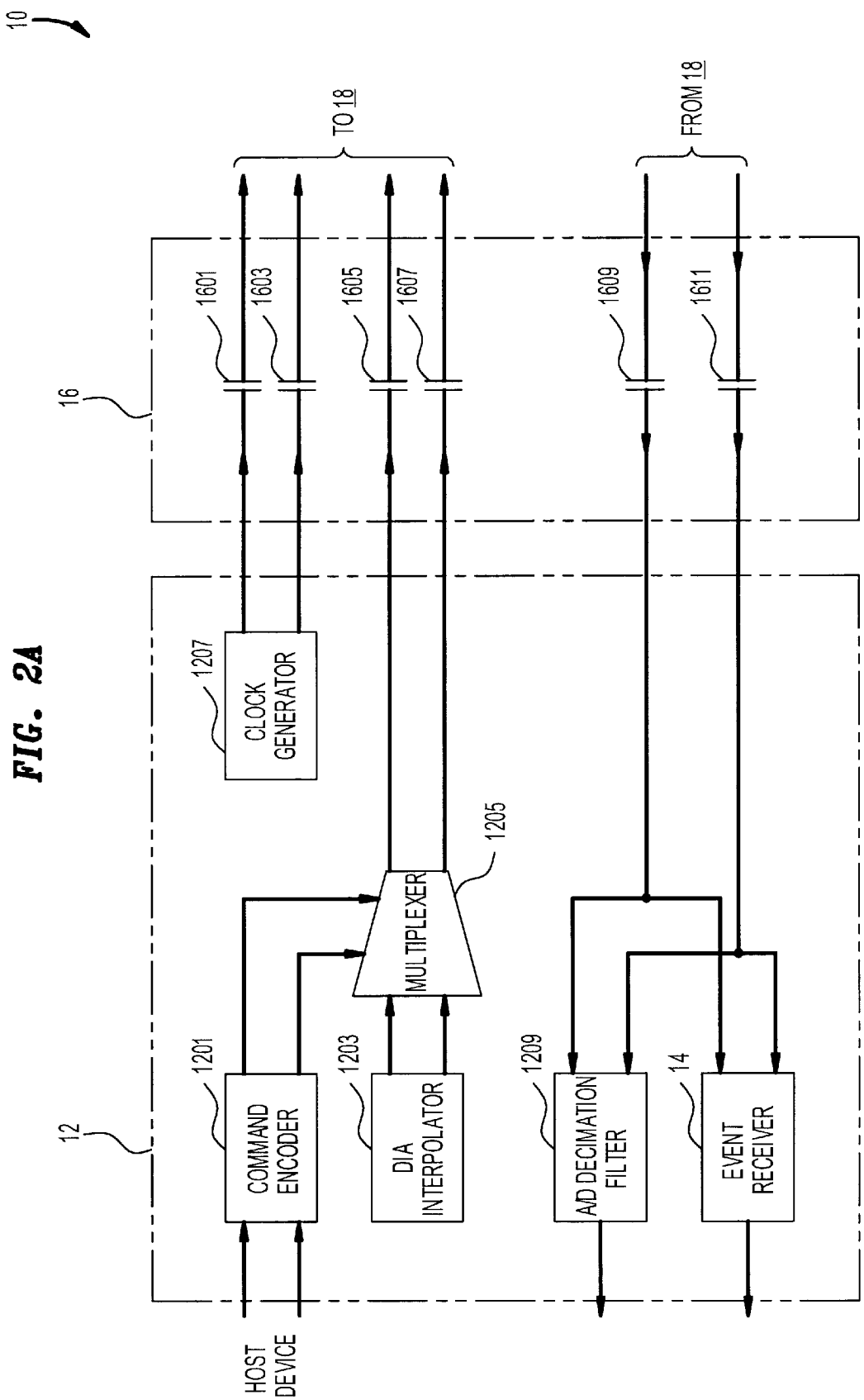
Figure 2C:
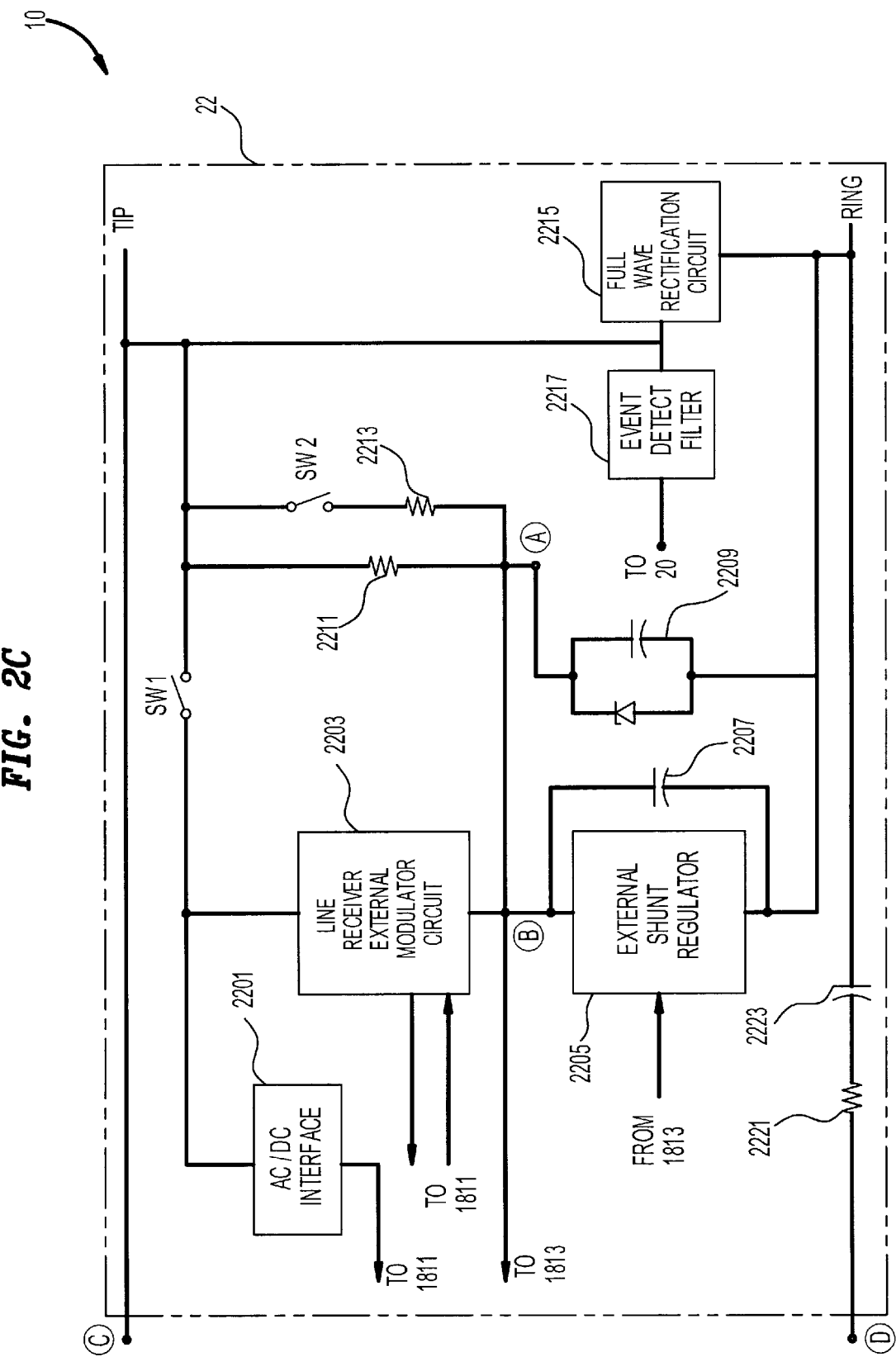

FIGS. 2A, 2B, 2C are detailed block diagrams depicting the various components of FIG. 1.

In FIG. 2A, the low voltage circuit 12 comprises a command encoder 1201, a D/A interpolator 1203, a multiplexer 1205, a clock generator 1207, an A/D decimation filter 1209 and an event receiver 14.

In FIG. 2B, the line powered codec 18 comprises a clock receiver 1801, a transmit data receiver 1803, a receive data transmit multiplexer 1805, an A/D & D/A converter 1807, a command and data decoder 1809, a low power A/D converter 1819, a line receiver internal modulator circuit 1811, a shunt regulator 1813, and an event detector 20.

In FIG. 2C, the sensory circuit 22 comprises an AC/DC interface 2201, a line receiver external modulator 2203, a shunt regulator 2205, a shunt capacitor 2207, a differential coupler 2209, a first resister 2211 and a second resistor 2213.

The low voltage interface circuit 12 is coupled to a host device located on the device side. Examples of this host device include a DSP, a computer, data terminals etc. Within the low voltage interface circuit 12, the command encoder 1201 and the D/A inerpolator 1203 are coupled to the multiplexer 1205 which is coupled to the isolation circuit 16.

The A/D decimation filter 1209 and the event receiver 14 are also coupled to an external DSP and to the isolation circuit 16. The A/D filter 1209 and the event receiver 14 are also coupled to each other.

In a preferred embodiment, the command encoder 1201 decodes the command signals from the host device, and the D/A interpolator 1203 and A/D decimation filter 1209 filter the incoming and outgoing digital signals from and to the host device to remove any noise or interference. The clock generator 1207 generates the clock signals which are transmitted to the codec 18 (via isolation circuit 16). The clock signals are indicative of the transmission of actual data signals.

The host device also sends control signals (e.g frame synchronization signal) and a clock signal to the low voltage circuit 12 to control the transfer of data between the host device and the low voltage circuit 12. The control signals may be transmitter control signals or receiver control signals. In response to the transmitter control signals, the low voltage circuit 12 acts on to receive data from the host device and transmits it to the line side. In particular, the low voltage circuit 12 may perform data compression, data encoding protocol, or format and error control operations to the incoming digital data signals from the host device and supply an outgoing digital signal to the codec 18 (via the isolation circuit 16). Likewise, in response to the receiver control signals, the low voltage circuit 12 may perform data encoding/recovery operations, data compression, data detection, and error detection upon incoming digital data signal supplied by the codec 18. Upon completion of the receiver operations, the low voltage circuit 12 sends received data signals to the host device.

The event receiver 14 located in low voltage circuit 12 helps to distinguish between an actual event and noise occurring in the network. Further details regarding event receiver 14 are given below with regard to FIG. 3 and its related description. The construction and operation of command encoder 1201, D/A interpolator 1203, clock generator 1207, A/D decimation filter 1209, are in general well known, and the connections thereof required by the present invention are apparent from the description herein.

An isolation circuit 16 is placed between the low voltage circuit 12 and the codec 18. The isolation circuit 16 comprises six capacitors (three pairs) 1601 and 1603, 1605 and 1607, and 1609 and 1611. One differential pair (capacitors 1605/1607) is needed in the transmit direction to carry data. Differential pair 1605/1607 is connected to the multiplexer 1205 in low voltage circuit 12 and to transmit data receiver 1803 in codec 18. The second differential pair (capacitors 1609/1611) is used in the reverse direction to carry data. Differential pair 1609/1611 is coupled to the codec 18, and to event receiver 14 and A/D decimation filter 1209 in the low voltage circuit 12. The clock signal can be included with the data on a differential path (not shown) or, alternately, (as shown), may be carried on a separate path through capacitor pair 1601/1603. Differential pair 1601/1603 is connected to clock generator 1207 of low voltage circuit 12 and to clock receiver 1810 in the codec 18.

The above described three differential pairs of capacitors form a communication channel in which differential data can be transmitted. Because the signals are transmitted differentially, two capacitors for each communications channel are required for both the transmit and receive path. In this manner, the high voltage interface can be provided by differentially driven capacitors of isolation circuit 16.

Before the actual transmission of the data, the low-voltage interface circuit 12 performs sigma-delta modulation on incoming digital signals and transmits them across isolation circuit 16 to the codec 18. Because the circuit is line-powered, it does not require a DC-DC convertor.

The codec 18 receives sigma-delta modulated data and performs a D/A conversion. The converted analog signal is separated into DC and AC components. The DC component controls the line termination current and the AC component controls the transmit sign modulation and AC line impedance.

In the codec 18, the clock receiver 1801 is coupled to the differential pair 1601/1603 located in the isolation circuit 16. The clock receiver 1801 is also coupled to command and data decoder 1809. The clock receiver 1801 receives the clock input generated by clock generator 1207, and forwards the clock signal to the command and data encoder 1809. The command and data decoder 1809 is directly coupled to A/D–D/A converter 1807 and to low power A/D converter 1819, and to an internal shunt regulator 1813.

The command and data decoder 1809 is responsible for determining whether the input signal from the low voltage circuit 12 is a command signal or actual data to be transmitted. Any data signals transmitting out of the line power codec 18 go through receive data transmit multiplexer 1805. The data signals transmitting into the line powered codec 18 are received through transmit data receiver 1803.

The command and data decoder 1809 is also coupled to line receiver internal modulator circuit 1811 and to low power A/D convertor 1819. This line receiver internal modulator circuit 1811 is coupled to line receiver external modulator circuit 2203.

In the sensory circuit 22, the line receiver external modulator circuit 2203 and an external shunt regulator 2205 are used to provide a controlled AC modulation and DC termination. The sensory circuit 22 includes a feedback path which is formed from TIP (referenced to RING) that extends to the host device and back to the codec 18. In the preferred embodiment, the feedback for controlling the DC termination is hard wired on the line side, while the AC termination is provided by a hard wired RC network also on the line side.

The sensory circuit 22 also comprises a full-wave rectification circuit 2215. This full-wave rectification circuit 2215 is directly coupled to TIP and RING terminals of the telephone line source on the line side. The rectification circuit 2215 includes a polarity guard (not shown) in it so that if TIP and RING terminals are reversed, the full wave rectification circuit 2215 will rectify any reversal on these terminals. It ensures that the same polarity of DC signal is presented to the codec 18 regardless of the DC polarity on the tip and ring of telephone line.

Directly connected to the full-wave rectification circuit 2215 is an event detect filter 2217. This event detect filter 2217 acts as an initial discriminating circuit to filter out high amplitude noise and other interference. The event detect filter 2217 may be programmed to block out any signals exceeding a predetermined threshold. The output of this event detector filter 2217 is directly connected to the event detect circuit 20 in the line powered codec 18. The event transmitter 20 receives an incoming signal indication (ringing or polarity reversal or noise) from the sensory circuit 22, and acts as a fast-acting screening device for determining what has occurred on a TIP and RING signal. It allows the determination to be made that there is an actual event that requires a response before switching the codec 18 to full power mode.

The differential coupler 2209 located in the sensory circuit 22 comprises a zener diode and a capacitor. The coupler 2209 is a voltage regulator and regulates the voltage of the line powered codec 18 in the low power mode. In a typical case, this voltage is regulated to 5 volts. This differential coupler 2209 is directly situated between the TIP and RING terminal and is directly connected to first resistor 2211. In a preferred embodiment, the resistor 2211 has a resistance of 5 Mega Ohms.

The sensory circuit 22 also has two switches—SW1 and SW2. These switches help to set the line powered codec into different modes. In the low power mode, both switches are open and a small amount of current is drawn from the TIP terminal to the resistor 2211 to the RING terminal. This current provides the required voltage (power) to the line powered codec 18. This current is regulated or adjusted by the differential coupler 2209 such that any current exceeding the required threshold is discarded. This results in a regulated, steady voltage to the line powered codec 18.

For the medium power state, SW2 is closed and the current is drawn from the second resistor 2213. In a preferred embodiment, this resistor has a resistance of 100 kilo-ohms. A small amount of current is still drawn from the resistor 2211, but it is minimal. Most of the required current is drawn from the second resistor 2213. Similar to the low power mode, the currents drawn are regulated by differential coupler 2209 such that only a steady, regulated voltage is supplied to the line powered codec 18.

For the full power mode (off hook) state, the first switch SW1 is closed and the current is primarily drawn from the TIP terminal to the line receiver external modulator circuit 2203. This line receiver external modulator circuit 2203 is a modulator circuit directly coupled to the line receiver internal modulator circuit 1811 of the line powered codec 18. In this mode, the current drawn is regulated by the external shunt regulator 2205. A small amount of current still flows through the first resistor 2211, but this current is minimal. In the preferred embodiment of this low power mode, the SW2 is open and no current flows through the second resistor 2213. However, in an alternative embodiment SW2 may be open. In this alternative embodiment, a small amount of current is drawn form the second resistor 2213, but, this current is very small when compared to the current drawn for the line receiver external modulator circuit 2203. In the full power mode, most of the current is drawn from the line receiver modulator circuit 2203.

The sensory circuit 22 also includes a resistor 2221 and a capacitor 2223 connected in series (this resistor and capacitor act as a pair). This output of the resistor 2221 is directly connected to the low power A/D convertor 1819 of the line powered codec 18. This pair senses the ringing signal or polarity reversal from TIP and RING and sends an indication to the event transmitter 20 that an incoming signal exists in the telephone line source The operation of the event transmitter 20 is explained in FIG. 3 and its related description. In sum, upon the receipt of the feedback signal indicating an incoming signal from the sensory circuit 22, the codec 18 turns on medium power mode. The event transmitter 20, operating in the medium power mode, by using an oscillator (not shown in FIG. 2) generates pulsed signals to a counter (not shown in FIG. 2). These pulses are generated only for a predetermined period of time. The counter counts the number of pulses generated in the predetermined period of time and compares to the expected response set by the line interface circuit 10. If the expected response has been received, the event receiver 14 generates an event-detect signal to the host device indicating that an actual event has been received.

If the event receiver 14 determines that a predetermined threshold of pulses has not been received in a predetermined period of time, the event transmitter 20 ignores the incoming signal as being noise (not shown in FIG. 2, but shown in FIG. 3) and no event-detect signal is generated to the host device.

After receiving the event-detect signal from the event receiver 14, the host device further decodes the incoming signal and sends a control signal to the clock generator 1207 located in the low voltage circuit 12. The clock generator 1207, upon the receipt of the control signal, generates a clock signal to the line powered codec 18 which puts the line powered codec 18 into a full power mode where actual data transmission initiates.

This clock signal from the clock generator 1207 then travels to the command and data decoder 1809. When this happens, the signal from TIP and RING is transmitted to low power A/D convertor 1819 and is forwarded to the receive data transmit multiplexer 1805, then to the isolation circuit 16, and finally to the host on the device side.

Next, the caller number (and in some cases caller identification) information is transmitted. After receiving the caller-identification information, the data transmission is facilitated between the line side and the host device.

To end the transmission, the host on the device side sends a control signal to the clock generator 1207 and the transmission is stopped by the drop of the clock-signal. The clock signal is continously generated by the clock generator 1207 during the transmission of the data. To drop the clock-signal, the clock generator 1207, upon the receipt of the control signal, terminates the generation of the clock-signal.

The sensory circuit 22 is capable of recognizing an incoming call on the telephone line side. In the United States, an incoming call is recognized by a ringing signal. Following the ringing signal, there is a frequency shift in the key data, followed by the caller ID, (name and phone number of person calling).

In several other countries, there is no ringing signal; instead an incoming call is recognized by having a reverse polarity on the phone lines. The reversal in polarity is followed by identification of the caller-ID, the ringing signal comes at the end.

The line interface circuit 10 is capable of detecting a ringing signal or a reversal in polarity. In the absence of a polarity reversal or ringing, the line interface circuit 10 operates in the sleep mode and very little power is drawn.

Figure 3:
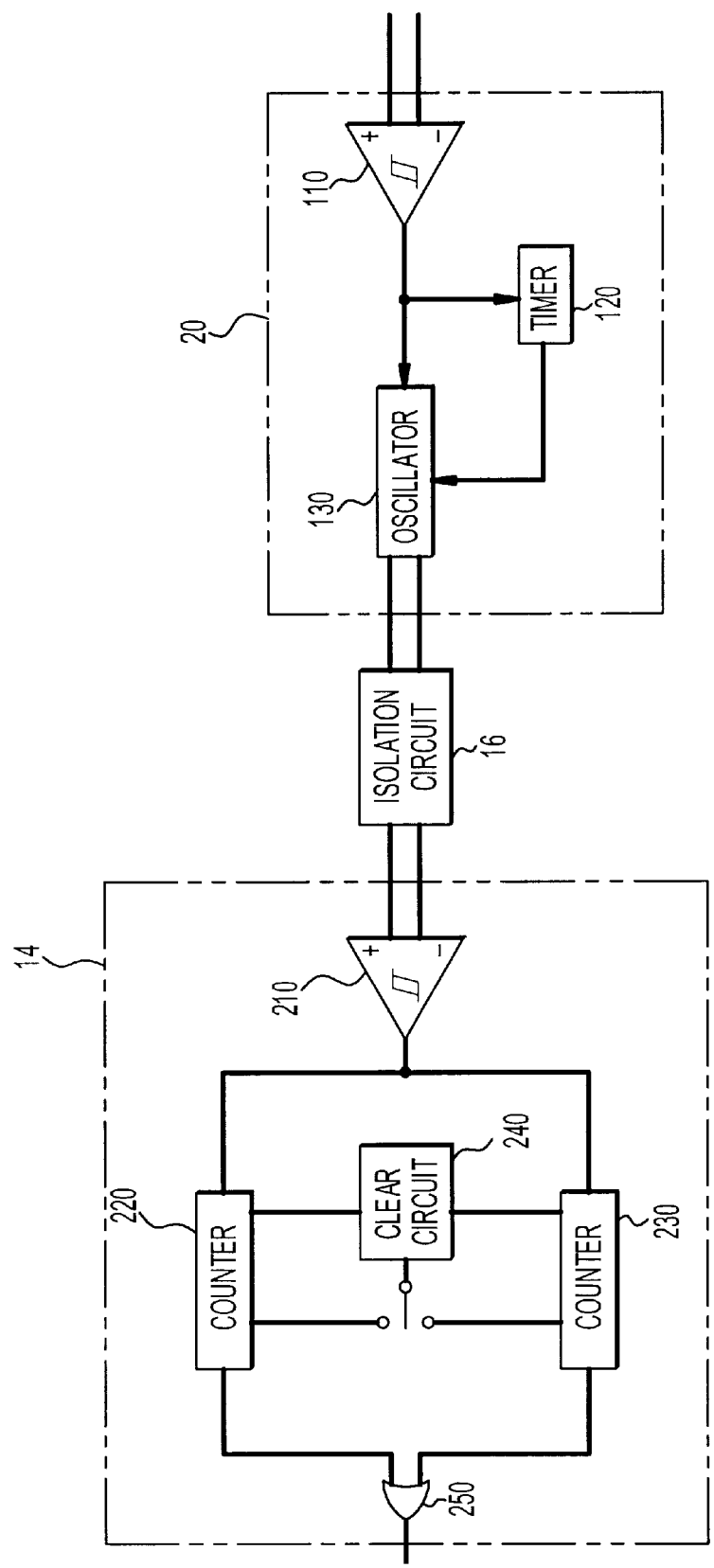
FIG. 3 is a block diagram illustrating a preferred embodiment of an event receiver and the event transmitter in accordance with the present invention.

FIG. 3 is a detailed block diagram of an event receiver 14 and an event transmitter 20 in accordance with the present invention. In FIG. 3, the event transmitter 20 comprises a differential comparator 110, a timer 120 coupled to the output of differential comparator 110, and an oscillator 130 coupled to the output of differential comparator 110 and the output of timer 120. Oscillator 130 operates at a frequency high enough that the capacitors in isolation circuit 16 receive sufficient energy to properly transmit a signal indicating the occurrence of an event to the low voltage circuit 12.

The event receiver 14 comprises a differential comparator 210, counters 220 and 230 coupled to the output of comparator 210, a clear circuit 240 switchably connectable between counter 220 and 230 via switch 245, and OR gate 250 coupled to the outputs of counters 220 and 230. Output counters 220 and 230 have an overflow output such that they output a digital signal when they reach capacity. Since events may occur at any time with respect to the sampling by the active counter, two parallel circuits are employed in the low-voltage event receiver 14 so that one counter may be cleared by clear circuit 240 while the other counter continues to register the event. Thus, via switch 245, clear circuit 240 alternately clears counter 220 and counter 230 so that an event in the process of being counted is not lost.

The oscillator 130 and timer 120 are coupled together. To reduce costs, the oscillator 130 can have process dependent variation such as a ring oscillator and a drive timer 120.

The event transmitter receives an indication from the sensory circuit 22 about an incoming signal (ringing, polarity reversal or noise). This indication is received from the event detect filter 2217 located in the sensory circuit 22 and has been filtered to block out any exceptionally high spike signals (e.g. high amplitude noise etc.). After receiving the feedback signal form the sensory circuit 22, the event transmitter 20 triggers timer 120 and oscillator 130 causing oscillator 130 to operate for the time period specified by timer 120. The output of oscillator 130 is directed across the isolation circuit 16. The output of oscillator 130 sends an AC signal across isolation circuit 16 in the form of a high-frequency sustained burst to the event receiver 14 located in the low voltage circuit 12. The event receiver 14 then outputs an event-detect signal to the host device indicating that an actual event has been received.

The event transmitter 20 and the event receiver 14 are designed such that a predetermined threshold of transients must occur within a predetermined time before event receiver 14 will output an event-detect signal that an actual event has occurred. It is virtually impossible for the event receiver 14 to respond to anything other than an actual event.

In the preferred embodiment, comparator 110 is a hysteresis comparator. If a particular signal is below a minimum differential current level, e.g., 100 $\mu$A AC peak-to-peak, the chance of the signal being a useable valid event is very low. Thus, it would be preferable to ignore such minimum signals. Therefore, the hysteresis is designed into the differential comparator 110 to produce a "dead band" below which the line interface circuit 10 will not respond.

By way of example and without limitation, in the preferred embodiment timer 120 is a 1 millisecond timer and oscillator 130 is a low power, 1 MHz oscillator. To reduce costs, the oscillator 130 can have process dependent variation such as a ring oscillator and should drive timer 120. By driving the timer 120 with the oscillator 130, if there is a variation in the 1 MHz oscillator signal, the period of timer 120 will be reduced when the oscillator frequency increases and will increase when the oscillator frequency decreases. For example, if the oscillator 130 is variable between 1 and 3 MHz, timer 120 will operate between 1 mS and 330 microseconds, depending on (and controlled by) the frequency of the oscillator 130. The low voltage circuitry of the event receiver 14 can be built to match these variations in terms of monitoring the event. This arrangement allows the use of a less-costly oscillator that does not require trimming.

In this example, if the oscillator 130 is controlled by timer 120 to remain active for 1 mS and the frequency of the oscillator 130 is 1 Mhz, and the capacitors 140 and 150 are 5 picoFarad capacitors, then 1000 pulses will be output to capacitors 140 and 150 when a signal is output from the differential comparator.

Since, in this example, 1,000 transients must occur within the 1 millisecond cycle of the timer 120 before event receiver 14 will output an indication that an actual event has occurred, it is virtually impossible for the event receiver 14 to respond to anything other than an actual event. If the event receiver 14 receives less than 1,000 transients within the period of clear circuit 240, the active counter in event receiver 14 is cleared and a new count begins. An actual event will appear on the counter as a 1 millisecond burst of oscillator 130, or in other words, greater than 1000 transients within the period of clear circuit 240 will occur, and this would be registered as an actual event.

In a preferred embodiment, Counters 220 and 230 are conventional binary counters with an overflow output so that they will output a digital signal when they reach capacity. As mentioned above, dual counters 220 and 230 are employed to assure that there is constant monitoring of the line. For example, in the example set forth above, a 1 mS timer is utilized. If half-way through the occurrence of an event (e.g., 0.5 mS into the event) the clear circuit 240 operates to clear counter 220, secondary counter 230, operating in parallel with counter 220, will properly register the event.

In sum, before the actual transmission of the data, the line interface circuit 10 develops an AC signal that represents the events that are desired to be detected. This AC signal is timed so that it has a sustained rate that is unlike any transient that would occur on the line. Thus, unless the incoming signal meets the timing requirement of the circuit, it is disregarded as being a transient and no action is taken to determine the exact nature of the signal. This avoids the need to invoke the discrimination circuits that have large power requirements until they are actually needed.

In the preferred embodiment, the event receiver 14 and event transmitter 20 are designed for lower power operation, e.g., it uses static CMOS circuitry operating at low frequencies, thereby drawing very little current. For example, event receiver 14 may be operating off the battery power of a lap top computer and must be able to operate on the power provided by the lap top computer when it is operating in the "battery saver" or "sleep" mode.

Thus, the line interface circuit 10 not only facilitates the data transmission between the line side and the device side, it also acts as a fast-acting screening device e.g., a "first line of defense" for determining what has occurred on a TIP and RING signal. It mostly operates on idle-state loop current, low power mode, and allows the determination to be made that there is an event that requires further investigation switching to off-hook power mode.

The events that would be considered valid on TIP and RING lines are those that are considered differential in nature. A differential event involves a current that flows from TIP to RING as opposed to a current that flows from TIP to system ground or RING to system ground. A current that flows to system ground is called a longitudinal or common-mode current. The line interface circuit 10 is designed to be sensitive to differential currents and insensitive to longitudinal or common-mode currents.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A telephone line interface circuit coupled between a telephone line source and a host device, said telephone line source providing input signals to said line interface circuit, said input signals comprising actual data signals and noise signals, said line interface circuit switchable between a low power mode, a medium power mode, and a full power mode, said line interface circuit comprising:
    an event detection circuit for detecting an actual data signal and for providing an event-detect signal to said host device only when an actual data signal is detected, comprising:
        an event transmitter for receiving said input signal from said telephone line source and generating output pulses in response to said input signal; and
        an event receiver for receiving said output pulses from said event transmitter, detecting whether said output pulses represent said actual data signal and generating an event-detect signal if said actual data signal has been detected;
    whereby upon receipt of said event-detect signal by said host device, said line interface circuit is switched to the full power mode.

2. The telephone line interface circuit of claim 1, wherein said line interface circuit is switched to the low power mode when there is no input signal from said telephone line source.

3. The telephone line interface circuit of claim 1, wherein said line powered interface circuit is switched to the medium power mode upon receipt of an input signal from said telephone line source.

4. The telephone line interface circuit of claim 1 wherein said event transmitter comprises:
    a differential comparator having inputs coupled to said telephone line source and an output;
    a timer having an input coupled to the output of said differential comparator and an output; and
    an oscillator having a first input coupled to the output of said differential comparator and a second input coupled to the output of said timer, and having an output coupled to said event receiver.

5. The telephone line interface circuit of claim 1 wherein said event receiver comprises:
    a counting device for counting the number of output pulses generated by said event transmitter;
    a clear circuit for clearing said counting device after a predetermined time period; and
    a gate for outputting said event-detect signal if said counter counts a predetermined number of said output signals within said predetermined time period.

6. The telephone line interface circuit of claim 1 wherein said event transmitter is capacitively coupled to said event receiver.

7. The telephone line interface circuit of claim 5 wherein said counting device comprises at least two binary counters operating in parallel and in alternating sequence, each binary counter having a threshold level which, when reached, causes said counter to output to said gate a signal indicating the reaching of said threshold level.

8. The telephone line interface circuit of claim 7 wherein said clear circuit comprises switching means for alternately clearing said binary counters after each occurrence of said predetermined time period.

9. The telephone line circuit of claim 1 further comprising:
    a sensory circuit coupled to said telephone line source and to said event detection circuit, said sensory circuit sensing an input signal on said telephone line source and outputting said input signal to said event detection circuit;
    a line powered codec coupled to said sensory circuit and to said event-detection circuit, said line powered codec encoding and decoding said actual data signals;
    an isolation circuit coupled to said line powered codec for electrically isolating said telephone line source and said host device from each other; and
    a low-voltage circuit directly coupled to said host device and to said isolation circuit, said low-voltage circuit transmitting said actual data signals to said host device, said low-voltage circuit receiving said actual data signals from said host device.

10. The circuit of claim 9, wherein said sensory circuit comprises:
    a full-wave rectifier coupled to said telephone line source;
    an event detect filter for blocking noise and interference exceeding a predetermined threshold, said event detect filter coupled to said event detection circuit;
    a shunt regulator coupled to said telephone line source for controlling the power supplied to said line powered codec; and
    a line modulator coupled in series with said shunt regulator to modulate the signals supplied to said line powered codec.

11. The apparatus of claim 9, wherein said isolation circuit comprises:
    a first capacitive pair for coupling said actual data signal from said line powered codec to s aid low voltage circuit;
    a second capacitive pair for coupling said actual data signal from said low-voltage circuit to said line powered codec; and
    a third capacitive pair for coupling control signal from said low-voltage circuit to said line powered codec.

12. The circuit of claim 9, wherein said low voltage circuit filters said actual data signal transmitting from said host device and transmitting to said host device for any error detection.

13. The circuit of claim 9, wherein said sensory circuit comprises a sensory resistor connected in series with a sensory capacitor, said sensory resistor coupled to said line powered codec.

14. The circuit of claim 9, wherein said line powered codec encodes said actual data signal incoming from said telephone line source and forwards said encoded signals to said low voltage circuit.

15. The circuit of claim 9, wherein said line powered codec decodes said actual data signal supplied by said host device and forwards said decoded signal to said telephone line source.

16. A telephone line interface circuit coupled between a telephone line source and a host device, said telephone line source providing input signals to said line interface circuit, said input signals comprising actual data signals and noise signals, said line interface circuit switchable between a low power mode, a medium power mode, and a full power mode, said line interface circuit comprising:

a sensory circuit coupled to said telephone line source and to said event detection circuit, said sensory circuit sensing an input signal on said telephone line source and outputting said input signal to said event detection circuit;

a line powered codec coupled to said sensory circuit, said line powered codec comprising an event-detection circuit comprising:

an event transmitter for receiving said input signal from said telephone line source and generating output pulses in response to said input signal; and an event receiver for receiving said output pulses from said event transmitter, detecting whether said output pulses represent said actual data signal and generating an event-detect signal if said actual data signal has been detected;

wherein said event detection circuit for detecting an actual data signal and for providing an event-detect signal to said host device only when an actual data signal is detected, whereby upon receipt of said event-detect signal by said host device, said line interface circuit is switched to the full power mode;

an isolation circuit coupled to said line powered codec for electrically isolating said telephone line source and said host device from each other; and a low-voltage circuit directly coupled to said host device and to said isolation circuit, said low-voltage circuit transmitting said actual data signals to said host device, said low-voltage circuit receiving said actual data signals from said host device.

17. The telephone line interface circuit of claim 16, wherein said line interface circuit is switched to the low power mode when there is no input signal from said telephone line source.

18. The telephone line interface circuit of claim 16, wherein said line powered interface circuit is switched to the medium power mode upon receipt of an input signal from said telephone line source.

19. The telephone line interface circuit of claim 16 wherein said event transmitter comprises:

a differential comparator having inputs coupled to said telephone line source and an output;

a timer having an input coupled to the output of said differential comparator and an output; and an oscillator having a first input coupled to the output of said differential comparator and a second input coupled to the output of said timer, and having an output coupled to said event receiver.

20. The telephone line interface circuit of claim 16 wherein said event receiver comprises:

a counting device for counting the number of output pulses generated by said event transmitter;

a clear circuit for clearing said counting device after a predetermined time period; and a gate for outputting said event-detect signal if said counter counts a predetermined number of said output signals within said predetermined time period.

21. The telephone line interface circuit of claim 20 wherein said counting device comprises at least two binary counters operating in parallel and in alternating sequence, each binary counter having a threshold level which, when reached, causes said counter to output to said gate a signal indicating the reaching of said threshold level.

22. The telephone line interface circuit of claim 21 wherein said clear circuit comprises switching means for alternately clearing said binary counters after each occurrence of said predetermined time period.

23. The telephone line interface circuit of claim 16 wherein said event transmitter is capacitively coupled to said event receiver.

24. The circuit of claim 16, wherein said sensory circuit comprises:

a full-wave rectifier coupled to said telephone line source;

an event detect filter for blocking noise and interference exceeding a predetermined threshold, said event detect filter coupled to said event detection circuit;

a shunt regulator coupled to said telephone line source for controlling the power supplied to said line powered codec; and a line modulator coupled in series with said shunt regulator to modulate the signals supplied to said line powered codec.

25. The apparatus of claim 16, wherein said isolation circuit comprises:

a first capacitive pair for coupling said actual data signal from said line powered codec to said low voltage circuit;

a second capacitive pair for coupling said actual data signal from said low-voltage circuit to said line powered codec; and a third capacitive pair for coupling control signal from said low-voltage circuit to said line powered codec.

26. The circuit of claim 16, wherein said low voltage circuit filters said actual data signal transmitting from said host device and transmitting to said host device for any error detection.

27. The circuit of claim 16, wherein said sensory circuit comprises a sensory resistor connected in series with a sensory capacitor, said sensory resistor coupled to said line powered codec.

28. The circuit of claim 16, wherein said line powered codec encodes said actual data signal incoming from said telephone line source and forwards said encoded signal to said low voltage circuit.

29. The circuit of claim 16, wherein said line powered codec decodes said actual data signal supplied by said host device and forwards said decoded signal to said telephone line source.

* * * * *